United States Patent [19]

Peter

[11] Patent Number: 5,593,226

[45] Date of Patent: Jan. 14, 1997

[54] APPARATUS FOR RECEIVING AND TRANSPORTING MATERIAL MIXED IN INTERNAL MIXERS USED FOR PROCESSING RUBBER MIXTURES

[75] Inventor: Julius Peter, Dommayergasse 7, A-1130 Vienna, Austria

[73] Assignees: Julius Peter, Vienna, Austria; Continental Aktiengesellschaft, Hannover, Germany

[21] Appl. No.: 426,612

[22] Filed: Apr. 21, 1995

[30] Foreign Application Priority Data

Apr. 22, 1994 [DE] Germany .......................... 44 14 039.8

[51] Int. Cl.[6] ................................................ B01F 7/02
[52] U.S. Cl. ................................................ 366/69; 366/77
[58] Field of Search .................. 366/14, 15, 69, 366/76.1, 76.7, 76.8, 76.9, 76.91, 76.92, 76.93, 77, 79, 83, 84, 85, 91, 184, 185, 186, 189, 192, 193, 196

[56] References Cited

U.S. PATENT DOCUMENTS

| | | | |
|---|---|---|---|
| 1,355,305 | 10/1920 | Bowen | 366/77 |
| 1,418,642 | 6/1922 | Gerard | 366/77 |
| 4,847,006 | 7/1989 | Hoglund | 366/69 |
| 5,061,078 | 10/1991 | Yada | 366/77 |
| 5,183,640 | 2/1993 | Peter | 366/77 |

*Primary Examiner*—Robert W. Jenkins
*Attorney, Agent, or Firm*—Robert W. Becker & Associates

[57] ABSTRACT

An apparatus for receiving and transporting material mixed in internal mixers used for processing rubber mixtures. At least one mixer is provided that has a discharge opening at the bottom. A closure that is pivotable about a horizontal axis is provided for opening and closing the discharge opening. At least one receptacle is adapted to be disposed below the discharge opening of the mixer for receiving mixed material from the mixer. After a receptacle has received mixed material from the mixer, and prior to closure of the closure, a receptacle is withdrawn in a closure direction of the closure.

13 Claims, 2 Drawing Sheets

5,593,226

APPARATUS FOR RECEIVING AND TRANSPORTING MATERIAL MIXED IN INTERNAL MIXERS USED FOR PROCESSING RUBBER MIXTURES

BACKGROUND OF THE INVENTION

The present invention relates to an apparatus for receiving and transporting material mixed in internal mixers that are used for processing rubber mixtures.

The term internal mixers as used in the context of this application means such mixers that operate in batches and that have a processing chamber for receiving the material that is to be mixed and rotors that rotate within the chamber and effect the kneading and mixing process, such mixers also having a closure means, generally called a closure saddle, that is disposed at the bottom of the processing chamber and that can close off the discharge opening for the mixed material and for emptying of the processing chamber can be pivoted downwardly about a horizontal axis.

With such mixers, especially where two mixers of this type are disposed one above the other, the overall height of the arrangement is considerable. This is particularly true if rolling or calendering devices, extruders, etc. are disposed immediately after the mixer. Furthermore, since the mixed material free falls from the mixer, the danger exists that mixed material can spring or escape to the side and is often added to other batches. This results in discrepancies in mixture quality.

It is an object of the present invention to eliminate the drawbacks of the heretofore known arrangements, or at least to significantly reduce the consequences of such drawbacks. In particular, the height of fall is to be reduced and hence the overall height should be reduced. Furthermore, the inventive apparatus is intended to ensure that the mixed material can be transported away with practically no losses and can be supplied in a correct condition for further processing of the rubber mixture.

BRIEF DESCRIPTION OF THE DRAWING

These and other objects and advantages of the present invention will appear more clearly from the following specification in conjunction with the accompanying schematic drawing, in which.

SUMMARY OF THE INVENTION

Figure 1:
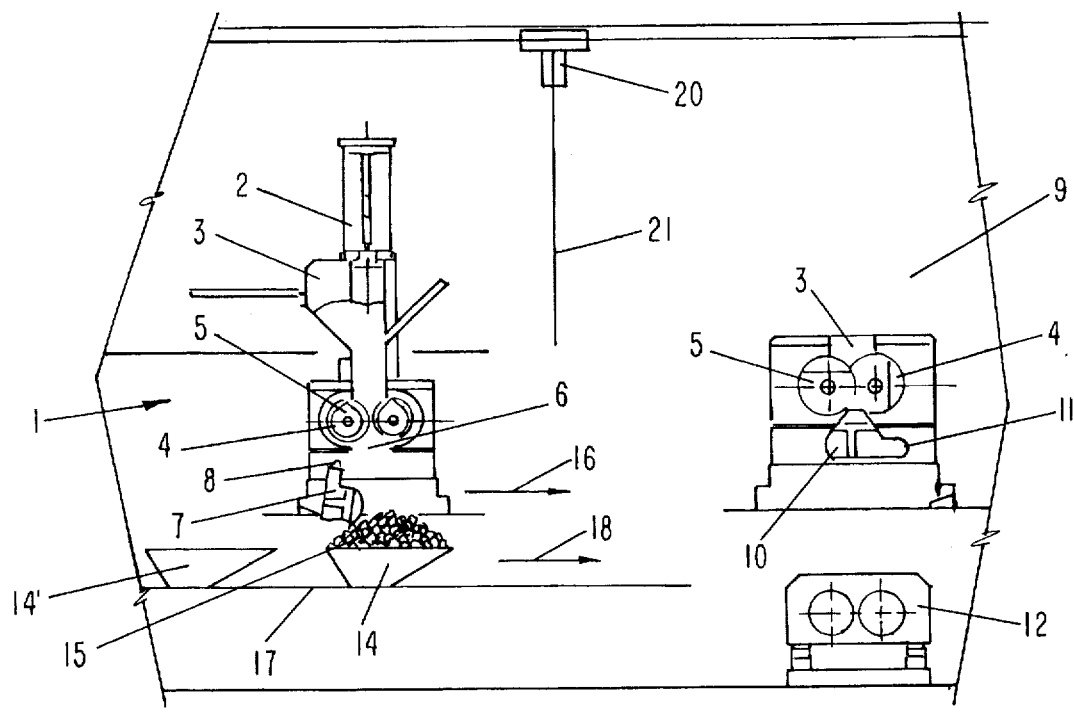
FIG. 1 illustrates one exemplary embodiment of the inventive mixing arrangement, including two so-called internal mixers for the rubber mixture that is to be produced.

The apparatus of the present invention is characterized primarily in that one or more receptacles are provided below the discharge opening of the treatment chamber of a mixer for receiving the mixed material; after receiving a charge of material, the containers can be withdrawn to the side in the closure direction of the closure means and prior to a closing movement thereof. This ensures that the receptacles, with the mixed material that may have accumulated therein, can be disposed in close proximity below the discharge opening of the processing chamber. No contact with the closure means can take place.

The receptacles are expediently components of a conveying mechanism, for example a circulating conveyor, the emptied receptacles of which are conveyed along designated paths from the loading station to the unloading station and again back to the loading station. The receptacles are preferably also embodied as tipping or dumping receptacles such that the receptacle can be emptied by being tipped. Furthermore, the receptacles can be provided with a suspension means in order to be able to convey the receptacles, for example after they have been charged, to a suspension track.

To load or charge them, the receptacles can be disposed in such close proximity below the discharge opening of the mixing chamber that the receptacles, or the mixed material that is piled up therein, is disposed in the pivot range, or at least in the vicinity of the pivot range, of the closure means without having to worry that the closing closure means come into contact with the receptacles and/or the contents thereof. The mixed material cannot miss the receptacle, and after it has reached the receptacle cannot "spring away". Furthermore, use of the inventive apparatus results in reduction of overall heights of 80–150 cm.

While the receptacles loaded with the mixed material are on their way in a conveying means to a further processing station, the contents of the containers can be checked, weighed or processed in some other manner. Thus, the transport path can serve further advantageous purposes.

Further specific features of the present invention will be described in detail subsequently.

DESCRIPTION OF THE PREFERRED EMBODIMENTS

Referring now to the drawing in detail, the illustrated mixer 1 is a ram kneader having a ram 2, a filling opening 3, a mixing chamber 4 in which are rotatably disposed rotors 5, a discharge opening 6 for the material that was mixed, and a closure means 7 for closing off the discharge opening 6. The closure means 7 is pivotable about a horizontal axis 8 and in the opened state illustrated in FIG. 1, after having been pivoted downwardly by about 90°, is disposed approximately vertically. Thus, when the mixing chamber 4 is closed, the closure means 7 is disposed approximately horizontally.

While the mixer 1 is preferably used to produce a base mixture or master batch, a mixer 9 can be used to produce the final mixture. The mixer 9 also has a filling opening 3, a mixing chamber 4 and rotors 5, so that it can operate as a kneader. The closure means 10 thereof is closed, with its horizontal pivot axis being designated by the reference numeral 11. In contrast to the mixer 1, the mixer 9 has no ram; it is therefore designed as a ramless kneader. Thus, the material that is to be mixed can be fed directly to the mixing chamber 4 via the filling opening 3.

Disposed below the mixer 9 is a rolling mill or calendaring device 12, from which the finished rubber mixture can be conveyed, for example in the form of sheets, etc. for further processing at 13.

The important thing for the present invention is that the rubber mixture that is processed in the mixer 1 passes by freefall into a receptacle 14, which is open at the top, when the closure means 7 is moved from the closed position into the opened position illustrated in FIG. 1. The filled state is indicated by the reference numeral 15. The receptacle 14 is a charge container and is equipped with various fittings and other members that permit suspension and dumping. These components can have any desired construction.

Figure 2:
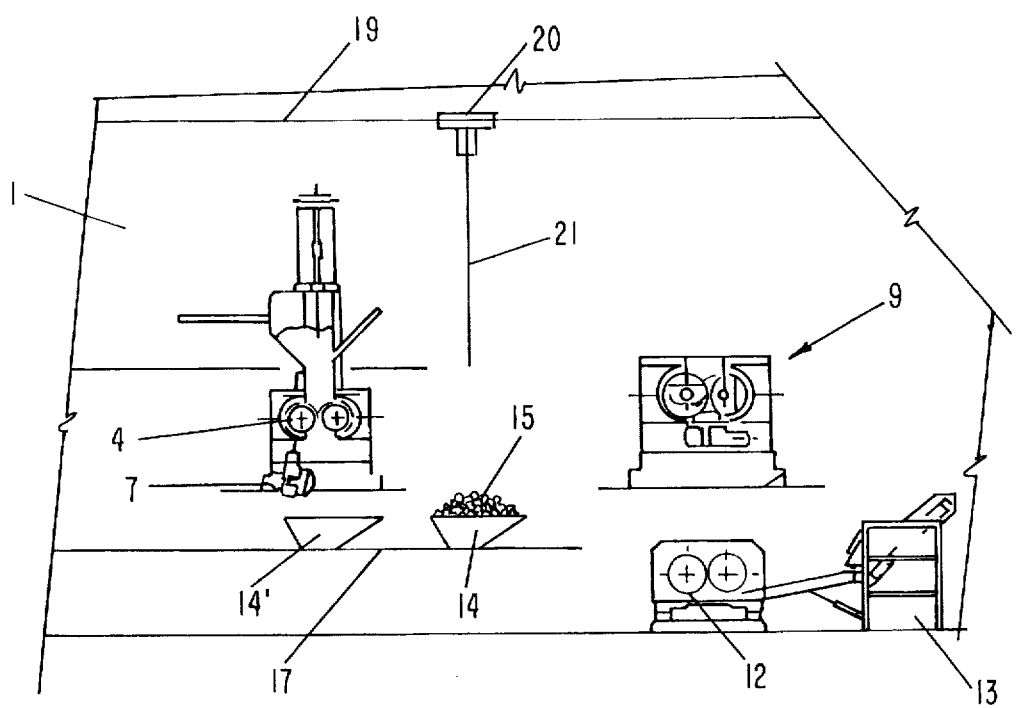
FIGS. 2 and 3 illustrate varying operating states of the mixing arrangement of FIG. 1.
Figure 2A:
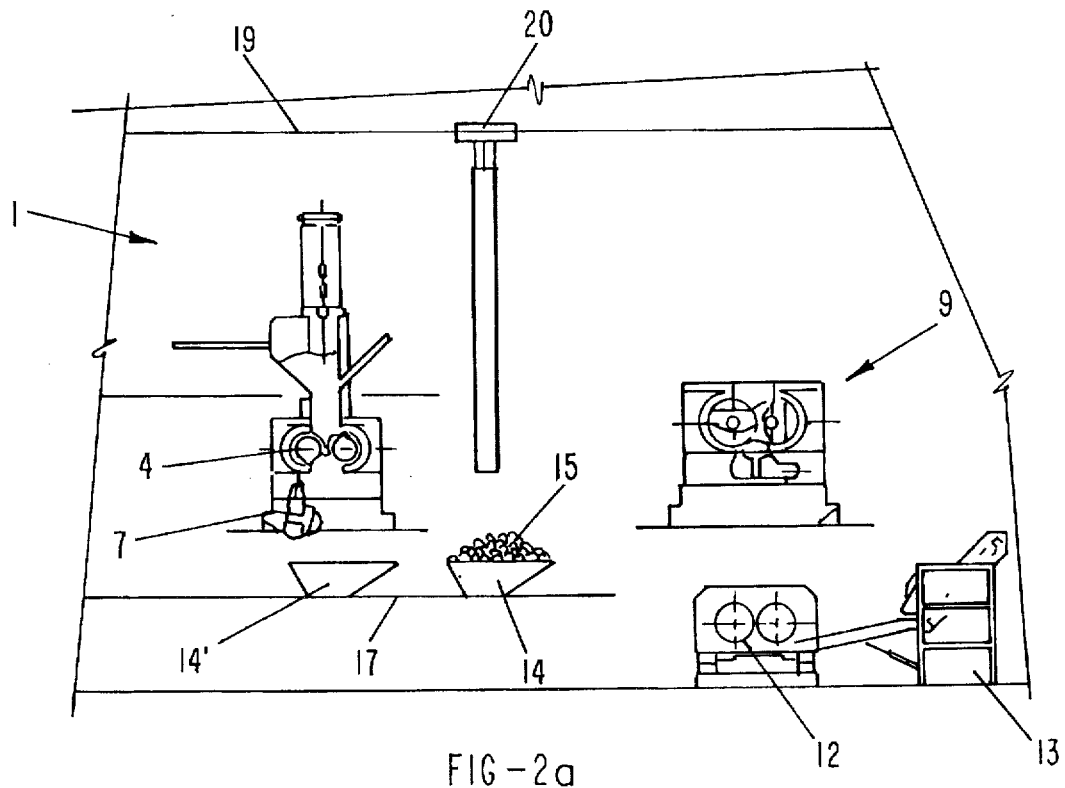

The receptacle 14 is placed below the discharge opening 6 prior to the conclusion of the mixing process in the mixer 1, while the closure means 7 is still closed. When the closure means 7 is pivoted downwardly, the mixed material free falls out of the discharge opening 6 and into the receptacle 14, which after it is filled can then be withdrawn or removed in the closing direction 16 of the closure means 7 onto a horizontal line or band 17 in the direction of the arrow 18. Immediately after the filled receptacle 14 is withdrawn, the next receptacle 14' is conveyed below the discharge opening 6 (see also FIG. 2).

Figure 3:
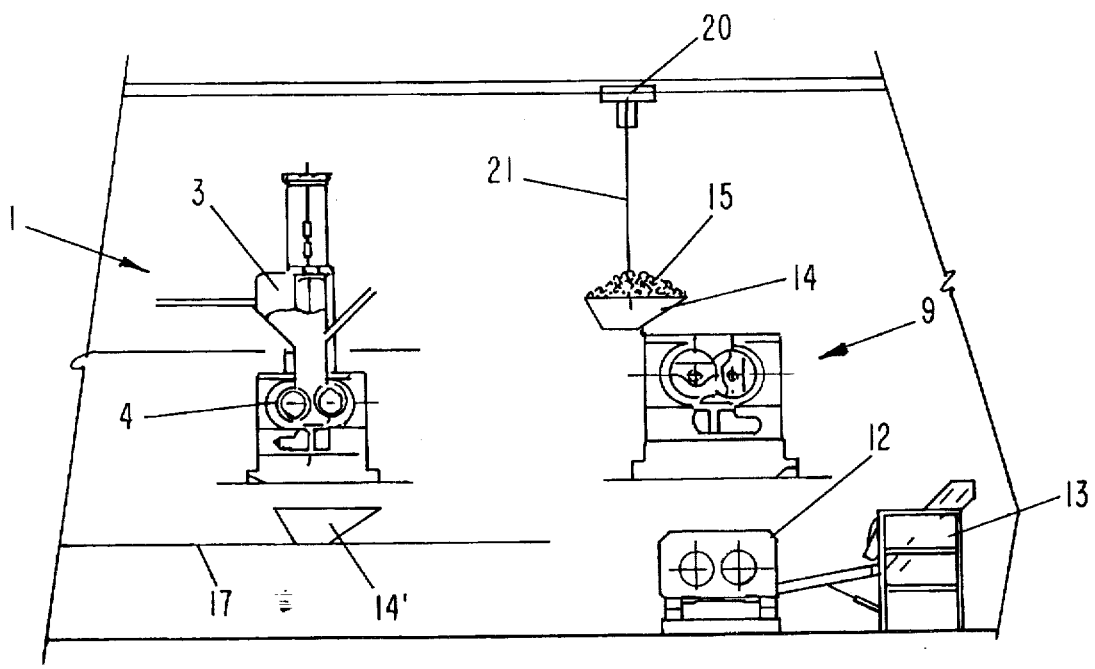

In order to be able to convey the rubber mixture 15 to the next processing station, a horizontal guideway 19 for a traveling winch 20 is provided above the mixer 1. As shown in FIG. 3, the hoisting cable 21 of the winch 20 picks up the receptacle 14 and conveys it over the mixer 9. The receptacle 14 is then tipped in order to dump the rubber mixture 15 into the mixer 9.

After completion of the mixing process in the mixer 9, the closure means 10 thereof is opened so that the final mixture can free fall into the device 12, from which the mixture is conveyed to the unit 13 in sheet form.

It is significant that along with the closing of the closure means 7 of the mixer 1 a new receptacle 14 is already placed in the ready state. In this connection, handling of the receptacles 14 can be undertaken in such a way that, with the exception of the transition period, a receptacle 14 is practically always disposed below the mixer 1 so that even if faulty control or incorrect operation of the apparatus occurs, a collection receptacle is in place.

As indicated previously, the lines 17, 19 can be circular paths in order to provide circulation of the receptacles.

It is also possible to associate more than one mixer 1 to, for example, the mixer 9. This can be accomplished by appropriate embodiment and control of the supply lines 17 and 19. Finally, with appropriate guide ways, it is also possible to form a warehouse for empty receptacles 14 in order to be able to select and appropriately use specific receptacles, for example according to size, condition, etc. It should be noted, however, that with many applications it is advantageous to rapidly undertake the transfer of the mixed material 15 from the mixer 1 to the mixer 9 such that the material 15 undergoes practically no cooling.

It should be noted that within the context of the present invention, the closing direction 16 of the closure means 7 means the direction described by the tip of the closure means from the approximately vertical position of rest at the beginning of the closure movement of the closure means 7 (the horizontal component of the curved pivot path). Furthermore, the transport element (the traveling winch 20) that is provided for the receptacle 14 can be embodied in such a way that it can be moved forward, to the rear, or to the side. Gripping means that can be hydraulically or pneumatically extended, and that could be pivotable, rotatable, and/or adjustable in height about an axis, could also be used to transport the receptacles 14; such gripping means could expediently be embodied as a boom or in the manner of an arm. Finally, the receptacles 14 can be movably disposed not only between two internal mixers, but also between an internal mixer on the one hand and a rolling or calendering device or a screw or double screw extruder. This last mentioned arrangement is particularly suitable if for reasons of space it is not expedient to superimpose units.

The present invention is, of course, in no way restricted to the specific disclosure of the specification and drawing, but also encompasses any modifications within the scope of the appended claims.

What I claim is:

1. An apparatus for receiving and transporting material mixed in internal mixers that are used for processing rubber mixtures, said apparatus comprising:

at least one mixer having a discharge opening on an underneath side thereof, and also having a closure means that is pivotable about a horizontal axis for opening and closing said discharge opening;

at least one receptacle adapted to be disposed below said discharge opening of said at least one mixer for receiving mixed material from said mixer;

means for withdrawing a receptacle, after it has received mixed material from said mixer and prior to closure of said closure means, in a direction of a horizontal component of a closing pivoting path of said closure means; and a further device, with said at least one receptacle being movable between said at least one mixer and said further device.

2. An apparatus according to claim 1, wherein said at least one receptacle is provided with fittings that permit raising and lowering of said receptacle.

3. An apparatus according to claim 1, wherein said receptacle is adapted to be disposed in close proximity below said discharge opening of said mixer such that said receptacle or a charge of mixed material therein is disposed at least in the proximity of said pivoting path of said closure means.

4. An apparatus according to claim 1, which includes two, at least essentially horizontal, track means for transporting said at least one receptacle at varying heights, said track means including an upper track means having a traveling winch-type conveying member via which said receptacle can be raised or lowered, and conveyed forward, to the rear or to the side.

5. An apparatus according to claim 1, which includes means for testing a rubber mixture in the vicinity of a transport path of said at least one receptacle.

6. An apparatus according to claim 1, which includes two receptacles disposed one behind the other, whereby a first one of said receptacles is adapted to be withdrawn after said receptacle has received mixed material, while a second one of said receptacles, as an empty receptacle, is adapted to be moved such that said second receptacle passes below said discharge opening after said first receptacle has been withdrawn.

7. An apparatus according to claim 1, wherein a plurality of receptacles are provided that are adapted to be selectively conveyed to said at least one mixer.

8. An apparatus according to claim 1, wherein said at least one receptacle is adapted to be moved between a mixer that is provided with a ram and a mixer that has no ram.

9. An apparatus according to claim 8, wherein said at least one receptacle is conveyed between said two mixers at such a rate of transport that mixed material carried along by said receptacle undergoes practically no cooling off.

10. An apparatus according to claim 1, which includes hydraulically or pneumatically extendable gripping arms for transporting said at least one receptacle, said gripping arms preferably being rotatable, pivotable, and adjustable in height about an axis.

11. An apparatus according to claim 1, which includes two mixers between which said at least one receptacle is movable.

12. An apparatus according to claim 1, which includes means for processing a rubber mixture in the vicinity of a transport path of said at least one receptacle.

13. An apparatus according to claim 1, which includes one internal mixer, and wherein said further device is one of the group consisting of a rolling device, a calendering device, and a screw extruder.

* * * * *